United States Patent [19]

Mertelmeier et al.

[11] Patent Number: 5,228,031
[45] Date of Patent: Jul. 13, 1993

[54] INTERCONNECTION ELEMENT FOR AN ASYNCHRONOUS TIME-DIVISION MULTIPLEX TRANSMISSION SYSTEM

[75] Inventors: Christine Mertelmeier; Roland Wolker, both of Erlangen, Fed. Rep. of Germany

[73] Assignee: U.S. Philips Corporation, New York, N.Y.

[21] Appl. No.: 656,899

[22] Filed: Feb. 15, 1991

[30] Foreign Application Priority Data

Feb. 16, 1990 [DE] Fed. Rep. of Germany ....... 4004889

[51] Int. Cl.$^5$ ............................................ H04Q 11/04
[52] U.S. Cl. ...................................... 370/58.1; 370/60
[58] Field of Search ...................... 370/58.1, 58.2, 67, 370/58.3, 63, 64, 62, 110.1, 94.1, 60, 100.1, 105.4, 105.5, 106–109; 375/116, 114; 340/825.8, 825.79

[56] References Cited

U.S. PATENT DOCUMENTS

| | | | |
|---|---|---|---|
| 4,280,217 | 7/1981 | Hafer et al. | 370/63 |
| 4,466,095 | 8/1984 | Kawano et al. | 370/58.1 |
| 4,495,615 | 1/1985 | Wilcke | 370/63 |
| 4,644,535 | 2/1987 | Johnson et al. | 370/58.1 |
| 4,680,752 | 7/1987 | Takemura et al. | 370/63 |
| 4,740,956 | 4/1988 | Hailpern et al. | 370/58.1 |
| 4,761,647 | 8/1988 | Hallenbeck et al. | 370/58.1 |
| 4,771,420 | 9/1981 | Deschaine et al. | 370/58.1 |
| 4,891,802 | 1/1990 | Jasmer et al. | 370/60 |

FOREIGN PATENT DOCUMENTS 0322075 6/1989 European Pat. Off. .
3714308 11/1988 Fed. Rep. of Germany .

OTHER PUBLICATIONS

IEEE Journal on Selected Areas in Communications Bd. 6, Nr. 9, Dec. 1988, pp. 1528–1537 "The Prelude ATD Experiment: Assessments and Future Prospects".

Primary Examiner—Douglas W. Olms
Assistant Examiner—Dang Ton
Attorney, Agent, or Firm—Leroy Eason

[57] ABSTRACT

An asynchronous time-division multiplex digital transmission system includes a switching network having a plurality of interconnection elements. Incoming data cells on respective input lines to an interconnection element during a time frame are temporarily stored in respective buffers and a converter circuit reassembles the data words therein into intermediate data blocks which respectively contain a set of sequentially corresponding data words of all of the cells, so that at least one intermediate block contains the data words which include the path identifications of such cells. The intermediate blocks are produced on respective intermediate lines (14a to 14d), and successive data words of the blocks on each intermediate line are successively entered into a buffer for such line. A comparator (16) is coupled to the intermediate line on which the block containing the data words which include path identification is produced, and from such data words determines the cell which is to be assigned to an output line of the interconnection element. The comparator actuates read-out of the data words of such assigned cell from the buffers, and a multiplexer (24) re-assembles them into such cell which is supplied to the output line of the interconnection element.

16 Claims, 2 Drawing Sheets

INTERCONNECTION ELEMENT FOR AN ASYNCHRONOUS TIME-DIVISION MULTIPLEX TRANSMISSION SYSTEM

CROSS-REFERENCE TO RELATED APPLICATION

This application is related to concurrently filed application Ser. No. 07/656,898, by the same inventors.

BACKGROUND OF THE INVENTION

1. Field of the Invention

The invention relates to an interconnection element for an asynchronous time-division multiplex digital transmission system wherein information cells which are incoming on input lines are transmitted to an output line by intermediate storage of the cells in buffers and evaluation in a comparator of the path identification contained in the cells.

2. Description of the Related Art

In an asynchronous time-division multiplex digital transmission system useful information, for example telephone, picture or sound signals, is transmitted in data blocks of a fixed length called cells, each cell having a predetermined number of bits. Each cell consists of a header field and an information field. The header field contains inter alia the path identification for the cell. Path identification should here be understood to mean connection identification giving path routing identification. The connection information comprises the data on the target or subtarget destination of the useful information. In certain transmission systems the path routing information is added within the system and contains data on a subtarget within the transmission system. The useful information is accommodated in the information field.

Consecutive time intervals (time frames) are assigned to consecutive cells. The duration of such a time interval depends on the clock frequency employed for the transmission system components. Even if no useful information is available, idle cells, i.e. cells without useful information, are transmitted in their assigned time frames. Cells containing useful information are designated useful cells.

During the transmission of the cells between subscribers, the cells pass through switching networks in which paths corresponding to the evaluation of the path identifications are established. Such a switching network may be composed of a plurality of switching network blocks. Such a switching network block having a plurality of input lines and output lines is comprised of a plurality of interconnection elements. An interconnection element has a plurality of input lines and an output line. In an interconnection element cells are then passed from the input line to an output line. On arrival of cells from a plurality of input lines during a time frame, wanting to access the output line, specific interconnection strategies are required.

The interconnection element defined above is known from published German application DE-OS 37 14 308. Therein the cells arriving on input lines are always stored in an input buffer. After evaluation of the path identification in a comparator (packet filter) assigned to each input line, the output line is enabled for those of the cells in the input buffer having a path identification in agreement with the address of the output line. If simultaneously several cells stored in the input buffers assigned to the input lines are to be provided to an output line, then a decision circuit cyclically enables each comparator assigned to an input buffer or an input line to output the cells from the relevant input buffers. Because of the fact that a comparator is assigned to each input line the interconnection element is expensive and complicated.

SUMMARY OF THE INVENTION

The invention has therefore for its object to provide an interconnection element for an asynchronous time-division multiplex digital transmission system, which can be realised with a reduced circuit cost and design effort.

In an interconnection element of the type defined in the opening paragraph this object is achieved in that in a converter circuit the cells are converted into intermediate blocks on respective intermediate lines at least one intermediate block containing the path identifications of the cells supplied via the input lines. After it has been evaluated that a path identification is assigned to the output line, the cell data contained in the different intermediate blocks are entered by the comparator which is coupled to at least one of the intermediate lines into buffers which are respectively assigned to each of the intermediate lines. A multiplexer connects the outputs of the buffers to the output line for reading a cell from the buffer.

With such an interconnection element the cells, which are fed forward on several input lines, are processed in the converter circuit so that at least the path identifications of the cells on the different lines during a time frame are entered into an intermediate block. It is alternatively possible to form still further intermediate blocks with the path identifications. Furthermore, useful information of the cells can also be added to the intermediate blocks containing the path identification. The remaining useful information components are organised in further intermediate blocks, which are conveyed to further intermediate lines. This redistribution provides that only certain of the intermediate lines, namely those over which the intermediate blocks which include path identification are conveyed, must each be connected to a comparator. Consequently, the number of comparators in such an interconnection element is reduced. It is no longer necessary to provide a comparator for each input line, so that the cost and design effort are reduced compared with the prior art interconnection element. For example, for the interconnection element of the invention a comparator is only required when the path identification is applied to an intermediate line via intermediate blocks. When the comparator has established that the path identification has been assigned to the output line, i.e. the associated cells are to be applied to this output line, the path identification of the cells and the remaining data re entered into buffers connected to the different intermediate lines. The data stored in the buffers are conveyed to the output line via a multiplexer. The cells are then again recomposed such as they were when applied to an input line. An idle cell detected by the comparator is not entered into the buffer. Furthermore, the cells are switched-through after their arrival with time, i.e. all the cells of a time frame are applied to an output line before the cells of the next time frame are conveyed to an output line.

In a further embodiment of the invention it is provided that in the converter circuit intermediate blocks composed of words present in the relevant cells in the same time intervals, are formed from the cells supplied on the input lines, which are always divided into words of equal time intervals and whose respective number of words corresponds to the number of input lines. Intermediate blocks which are composed of words of the different cells and whose number of words corresponds to the number of words of a cell, are formed on the intermediate lines. A condition for this formation is that the number of intermediate lines must correspond to the number of input lines. This measure ensures that the buffers are uniformly filled and consequently optimally utilized. The intermediate blocks can then be conveyed simultaneously or with a certain delay to the intermediate lines. As the buffers are not accommodated on the input lines as in the prior art interconnection element, the buffers can be of a smaller size. Namely, with the measures in accordance with the invention, the cells are uniformly distributed over the buffers and it can not happen, as in the prior art interconnection element, that more cells are stored in one buffer than in another, whereas during a period more cells arrive on one input line than on another input line.

So as to keep the cost and design effort for the interconnection element as low as possible, it is provided that the converter circuit forms the intermediate block from the first word of a cell containing the path identification and that the comparator is coupled to the intermediate line transmitting the first word of such cell. As the path identification is only in the first word of a cell and the first words are only conveyed via an intermediate line, an interconnection element requires only one comparator.

When the comparator has detected that the path identification of a cell is assigned to the output line, an output control circuit enables the buffers for entering therein the words of such cell in the temporal sequences of their occurrence. In this situation, provided the words of a cell have not been shifted in time, they are simultaneously entered into the buffers, whilst, when the intermediate blocks have been subjected to a time shift, the words are entered consecutively. The operation of reading the words from the buffers is controlled by an output control circuit. This circuit connects the output lines to the buffer outputs by a cyclic control of the multiplexer in the sequence in which the words of a cell were entered into the buffers. The cell then appears on the output line in the form in which it was supplied on an input line.

The converter circuit can be realised in a simple manner when it shifts the intermediate blocks relative to each other by the time interval of a word, so that the temporal sequence of the intermediate blocks corresponds to the temporal sequence of the words in a cell. To that end, the converter circuit includes a synchronizing circuit which always shifts cells fed forward on the input lines through the duration of a time interval of a word relative to each other and furthermore a multiplexer arrangement which forms the intermediate blocks from the cells which are always shifted through the duration of a time interval of a word. Then, the synchronizing circuit must first synchronize the cells arriving during a time frame with each other and then effect the time shift.

The reorganisation of the cells into intermediate blocks is effected in the multiplexer arrangement. This arrangement effects the reorganisation with the aid of individual multiplexers whose outputs are always connected to an intermediate line and whose inputs are always cyclically connected to an output of the synchronizing circuit by controlling the input control circuit.

BRIEF DESCRIPTION OF THE DRAWING

Embodiments of the invention will now be described in greater detail with reference to the accompanying drawings. Therein.

DESCRIPTION OF THE PREFERRED EMBODIMENT

The principle of an asynchronous time-division multiplex digital transmission system can be explained with reference to the block circuit diagram shown in FIG. 1. The signals of a terminal unit, for example television, picture or sound signals, are segmented into packets in a packeting device and provided with a header field which contains a path identification, The path identification comprises the data on the target destination of the signals. Such a terminal unit and the packeting device form a subscriber terminal unit 1. The data of such a terminal unit are transmitted within a time interval (time frame) in the form of cells. The duration of such a time frame then depends on the utilized clock frequency of the transmission system. Such cells consist of the header field and the useful information. If no data are to be transmitted within a time frame, an idle cell is formed, i.e. a cell whose header field contains an indication that no further information will follow. Such idle cells are used to synchronize the system. The cells carrying a useful information are denoted useful cells.

Figure 1:
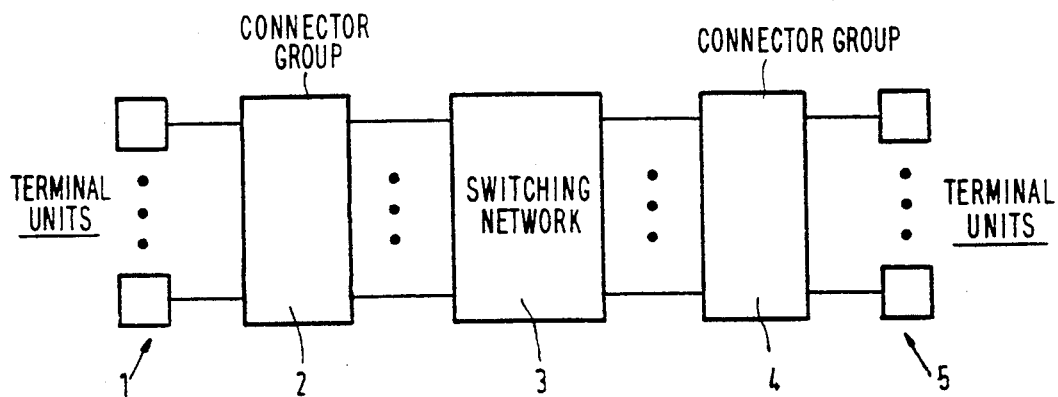
FIG. 1 is a block circuit diagram of an asynchronous time-division multiplex transmission system.

In the block circuit diagram shown in FIG. 1, the data of, for example, 64 subscriber terminal units 1 are transmitted to a connector group 2 over 64 lines each having a capacity of 150 Mbit/s. The data are combined in the connector group 2 and transmitted via a lower number of lines having a higher capacity. These data can, for example, be conveyed over 16 lines each having a capacity of 600 Mbit/s. Through-putting of the data is effected in a subsequent switching network 3 formed by a plurality of switching network blocks which in their turn are formed by a plurality of interconnection elements, and evaluating the path identification by applying the data to a predetermined number of output lines. In this case an interconnection element consists of a circuit arrangement connected to a plurality of input lines and to one output line. The circuit arrangement or the interconnection element respectively, can determine data to be passed on via the output line connected to the interconnection element, and provide the require paths within the circuit arrangement. The switching network 3 has here also a plurality of lines, for example 16 lines, having a capacity of 600 Mbits/s connected to a connector group 4. The connector group 4 passes the received data on to subscriber terminal arrangements 5 over lines. For this purpose 64 lines are, for example, provided, each having a capacity of 150 Mbits/s. Such a system also transmits data from the subscriber terminal arrangement 5 to the subscriber terminal arrangement 1.

Figures 3A, 3B, 3C:
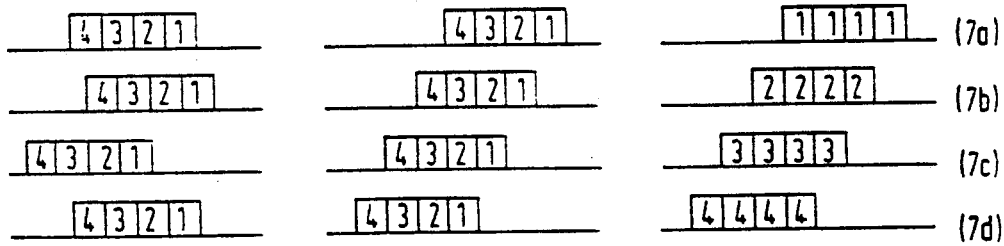
FIG. 3 shows an example of the temporal relationship between words and cells conveyed over the lines shown in FIG. 2.
Figure 2:
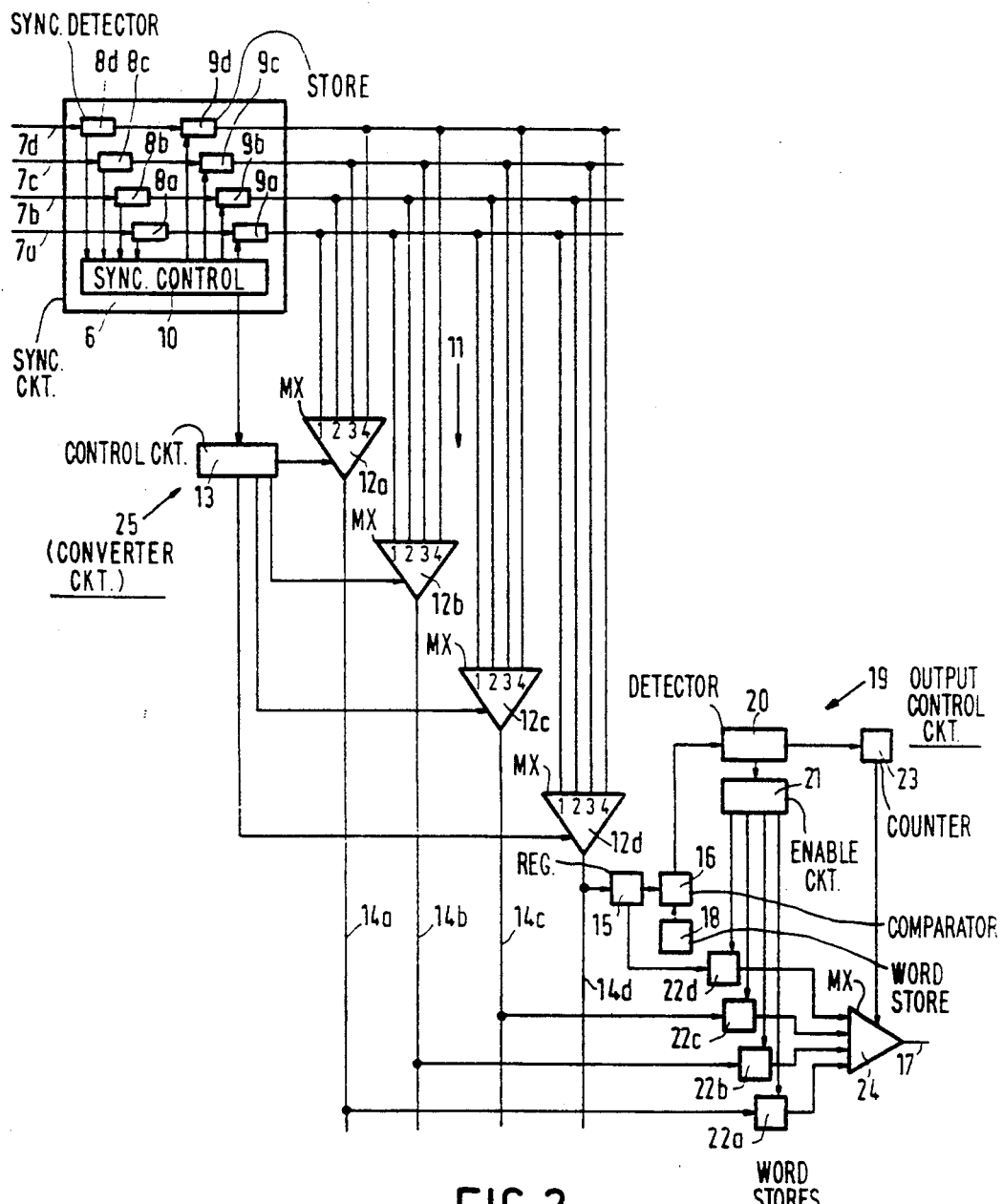
FIG. 2 is a simplified representation of an interconnection element in accordance with the invention.

FIG. 2 shows an interconnection element which is part of a switching network. The interconnection element includes a converter circuit 25 having a synchronizing circuit 6, which is connected to four input lines 7a to d. Data in the form of cells are applied to the synchronizing circuit 6 via the input lines 7a to d. Within any particular time frame such cells are conveyed over the input lines 7a to d. These cells are not in synchronism with each other, as is shown in FIG. 3a. FIG. 3a shows four cells which are respectively conveyed to the synchronizing circuit 6 over the input lines 7a to d. These cells are divided into four words. The words always have the same time spacing (equal number of bits). As the individual cells are not synchronized with time relative to each other, they must by synchronized in the synchronizing circuit 6 and always shifted through one word with respect to each other, as is shown in FIG. 3b. The cell on the line 7a is subjected to a time shift of one word relative to the cell on the line 7b. Furthermore, the cell on the line 7b is shifted through one word relative to the cell on the line 7c and the cell on line 7c is likewise shifted through one word relative to the cell on the line 7d. In this situation, the cells on the line 7a are read three words earlier from the synchronizing circuit 6 than the cells on the line 7d.

Such a synchronization and time shift can, for example, be effected by means of synchronizing-detection circuits 8a to d, four stores 9a to d and a synchronizing control circuit 10. The synchronizing-detection circuits 8a to d detect the beginning of a cell and apply a relevant signal to the synchronizing control circuit 10. In response thereto, the synchronizing control circuit 10 enables a store 9a to d, so that a cell can be entered into the store. After all the cells have been entered into the stores 9a to d, the cell in the store 9d is read in response to a corresponding command from the synchronizing control circuit 10. Subsequent thereto, the remaining cells are read from the stores 9c to a with a time shift, as shown in FIG. 3b.

It should be noted that for the sake of clarity the lines shown in FIG. 2 are represented as one line, although they partially consist of a plurality of parallel lines. Also the clock pulse lines and clock generators required for the control of the individual digital circuit elements are not shown.

The four lines leading from the synchronizing circuit 6 are connected to a multiplexer arrangement 11, which is part of the complete converter circuit 25. This multiplexer arrangement 11 includes four individual multiplexers 12a to d and an input control circuit 13. The individual multiplexers 12a to d have their outputs respectively connected to respective intermediate lines 14 a to d. By means of the multiplexer arrangement the cells, which have been shifted through one word relative to each other, are redistributed to form intermediate blocks. Such an intermediate block includes those words that occur in all of the respective cells during the same time interval, i.e. an intermediate block with the first word of all cells appears at the output of the multiplexer 12d. The second to fourth words of the cells respectively appear at the outputs of the respective multiplexers 12c to a. The resulting intermediate blocks that respectively appear on the lines 14a to d are shown in FIG. 3c.

The control of the individual multiplexers 12a to d is effected by means of the input control circuit 13, which may, for example, be formed by a counter. From the synchronizing circuit 6 the input control circuit 13 receives an enable signal when the cells are read from the stores 9a to 9d. In this case certain inputs of the individual multiplexers 12a to d are enabled by the input control circuit 13 for always the duration of the time interval of a word. These inputs of the multiplexers are denoted in FIG. 2 by the reference numerals 1 to 4. The input 3 of the multiplexer 12a, the input 2 of the multiplexer 12b, the input 1 of the multiplexer 12c and the input 4 of the multiplexer 12d are first enabled. The first word of the cell from the store 9d then appears on the intermediate line 14d. For the next word the input 2 of the individual multiplexer 12a, the input 1 of the individual multiplexer 12b, the input 4 of the individual multiplexer 12c and the input 3 of the individual multiplexer 12d are enabled. Then on the line 14d the first word of the cell from the store 9c appears and on the line 14c the second word of the cell from the store 9d. In the subsequent switching procedure the input 1 of the individual multiplexer 12a, the input 4 of the individual multiplexer 12b, the input 3 of the individual multiplexer 12c and the input 2 of the individual multiplexer 12d are enabled. The switching procedure ends by enabling the input 4 of the individual multiplexer 12a, the input 3 of the individual multiplexer 12b, the input 2 of the individual multiplexer 12c and the input 1 of the individual multiplexer 12d. This cycle is subsequently repeated from the start until all the words of the cells stored in the stores 9a to d on the lines 14a to d have been read.

Such a redistribution of the words of a cell is only possible when the cells have the same number of words as there are input lines.

A register 15 in which always the first word of a cell is entered, is connected to the input line 14d. The first word must absolutely contain the path identification. In a comparator 16, connected to the register 15, the path identification available in the first word of a cell, is evaluated. If by evaluating information stored in the store 18 the comparator 16 detects that the cell is assigned to the output line 17, a detector 20 will in an output control circuit 19 induce an enable circuit 21 to enable buffers 22a to d for entering the words of a cell. The enable circuit 21 then enables the buffers 22a to d in accordance with the occurrence of the words on the lines 14a to d. Thus, the buffer 22d is first enabled for reading the first word of a cell from the buffer 15. After the time interval of a word has elapsed, the buffer 22c is enabled to read the second word of the cell. Simultaneously, the first word of the subsequent cell can already be entered into the buffer 22d. The same procedure is performed for enabling the buffers 22b and a. The buffers 22a to d are FIFO's. The FIFO's must be dimensioned such, that overflow is substantially not possible. The storage capacity of the FIFO's can be determined by traffic simulation of the interconnection element. The detector 20 of the output control circuit 19 also enables a counter 23 which controls a multiplexer 24. The multiplexer 24 connects one of its four inputs to output line 17. The multiplexer 24 is controlled such that a cell beginning with the first word and ending with the fourth word is applied to the output line 17.

When an idle cell is not assigned to the output line 17 and the buffers 22a to 22d will not be enabled. Consequently, no idle cell but only a useful cell will be conveyed to the output line 17.

With the interconnection element which is here shown, for the sake of simplicity, with four input lines, the number of input lines may be much larger. The number of words of a cell must then however be equal to the number of input lines.

We claim:

1. An asynchronous time-division multiplex digital transmission system including a switching network for receiving data cells on a plurality of input lines and selectively switching them to a plurality of output lines, each data cell containing successive data words one of which includes a path identification of such cell, the switching network including a plurality of interconnection elements coupled to said input lines and respectively coupled to respective ones of said output lines; each of said interconnection elements comprising:

storage means for temporarily storing cells received on the respective input lines during a multiplexed time frame;

a converter circuit coupled to said storage means for converting the cells stored therein into intermediate data blocks respectively produced on respective intermediate lines, each intermediate data block containing a sequentially corresponding data word from each of the stored cells, so that the intermediate data block on one of said intermediate lines contains said one data word of each of the stored cells; and an output control circuit coupled via respective buffers to the respective intermediate lines and having an output coupled to the output line of said interconnection element, each of said buffers being for temporarily storing a data word of the intermediate data block on the intermediate line coupled to such buffer;

said output control circuit comprising comparator means coupled to said one intermediate line for evaluating each successive data word of the intermediate data block on such line to determine whether one of such data words has a path identification which corresponds to the output line of said interconnection element, and in that event producing a gating signal for gating out of said buffers the data words then stored therein; and multiplexing means for receiving the data words gated from said buffers and re-assembling them into the cell having a path identification which corresponds to said output line, such re-assembled cell being supplied to said output line.

2. A time-division multiplex transmission system as claimed in claim 1, characterized in that the cells which are conveyed on the input lines (7a to d) each include data words of equal time intervals and of a number which corresponds to the number of input lines, each intermediate block being formed from the words in the respective cells during the same time intervals.

3. A time-division multiplex transmission system as claimed in claim 2, characterized in that said comparator means includes a comparator (16) which is coupled to said one intermediate line (14d) which transmits said one intermediate data block.

4. A time-division multiplex transmission system as claimed in claim 3, characterized in that after said comparator means has detected that a data word on the intermediate line (14d) coupled thereto has a path identification which corresponds to the output line (17), said output control circuit (19) gates out of said buffers (22a to d) the data words stored therein in the time sequence in which they occur in a cell, and connects said output line to the outputs of said buffers by cyclic control of said multiplexing means (24) in the same sequence as such data words were entered into said buffers.

5. A time-division multiplex transmission system as claimed in claim 4, characterized in that in addition the converter circuit (25) shifts the intermediate blocks relative to each other through the time interval of a data word always in such a manner that the time sequence of the intermediate blocks corresponds to the time sequence of the data words in a cell.

6. A time-division multiplex transmission system as claimed in claim 5, characterized in that the converter circuit (25) comprises: a synchronizing circuit (6) which shifts the cells received on the respective input lines (7a to d) relative to each other always through the time interval of a data word; and a multiplexer arrangement (11) for forming the intermediate blocks from the time-shifted received cells.

7. A time-division multiplex transmission system as claimed in claim 6, characterized in that the multiplexer arrangement (11) includes individual multiplexers (12a to d) each having an output connected to a respective one of the intermediate lines (14a to d) and having inputs which are cyclically connected via respective stores (9a to d) to respective inputs of the synchronizing circuit (6).

8. A time-division multiplex transmission system as claimed in claim 3, characterized in that in addition the converter circuit (25) shifts the intermediate blocks relative to each other through the time interval of a data word always in such a manner that the time sequence of the intermediate blocks corresponds to the time sequence of the data words in a cell.

9. A time-division multiplex transmission system as claimed in claim 2, characterized in that in addition the converter circuit (25) shifts the intermediate blocks relative to each other through the time interval of a data word always in such a manner that the time sequence of the intermediate blocks corresponds to the time sequence of the data words in a cell.

10. A time-division multiplex transmission system as claimed in claim 1, characterized in that in addition the converter circuit (25) shifts the intermediate blocks relative to each other through the time interval of a data word always in such a manner that the time sequence of the intermediate blocks corresponds to the time sequence of the data words in a cell.

11. A time-division multiplex transmission system as claimed in claim 10, characterized in that the converter circuit (25) comprises: a synchronizing circuit (6) which shifts the cells received on the respective input lines (7a to d) relative to each other always through the time interval of a data word; and a multiplexer arrangement (11) for forming the intermediate blocks from the time-shifted received cells.

12. A time-division multiplex transmission system as claimed in claim 11, characterized in that the multiplexer arrangement (11) includes individual multiplexers (12a to d) each having an output connected to a respective one of the intermediate lines (14a to d) and having inputs which are cyclically connected via respective stores (9a to d) to respective inputs of the synchronizing circuit (6).

13. An interconnection element for use in a switching network of an asynchronous time-division multiplex digital transmission system, said element being adapted to select from among data cells respectively received on respective input lines during a multiplex time frame a cell which is to be transmitted to an output line of said element, each cell containing successive data words one of which includes a path identification of such cell; said interconnection element comprising:

storage means for temporarily storing cells received on the respective input lines during a multiplexed time frame;

a converter circuit coupled to said storage means for converting the cells stored therein into intermediate data blocks respectively produced on respective intermediate lines, each intermediate data block containing a sequentially corresponding data word from each of the stored cells, so that the intermediate data block on one of said intermediate lines contains said one data word of each of the stored cells; and an output control circuit coupled via respective buffers to the respective intermediate lines and having an output coupled to the output line of said interconnection element, each of said buffers being for temporarily storing a data word of the intermediate data block on the intermediate line coupled to such buffer;

said output control circuit comprising:

comparator means coupled to said one intermediate line for evaluating each successive data word of the intermediate data block on such line to determine whether one of such data words has a path identification which corresponds to the output line of said interconnection element, and in that event producing a gating signal for gating out of said buffers the data words then stored therein; and multiplexing means for receiving the data words gated from said buffers and re-assembling them into the cell having a path identification which corresponds to said output line, such re-assembled cell being supplied to said output line.

14. An element as claimed in claim 13, characterized in that the cells which are conveyed on the input lines (7a to d) each include data words of equal time intervals and of a number which corresponds to the number of input lines, each intermediate block being formed from the words in the respective cells during the same time intervals.

15. An element as claimed in claim 14, characterized in that said comparator means includes a comparator (16) which is coupled to said one intermediate line (14d) which transmits said one intermediate data block.

16. An element as claimed in claim 15, characterized in that after said comparator means has detected that a data word on the intermediate line (14d) coupled thereto has a path identification which corresponds to the output line (17), said output control circuit (19) gates out of said buffers (22a to d) the data words stored therein in the time sequence in which they occur in a cell, and connects said output line to the outputs of said buffers by cyclic control of said multiplexing means (24) in the same sequence as such data words were entered into said buffers.

* * * * *